Aug. 25, 1953   C. E. KERR ET AL   2,649,676
APPARATUS FOR HANDLING CARTONS
Original Filed July 8, 1946   6 Sheets-Sheet 2
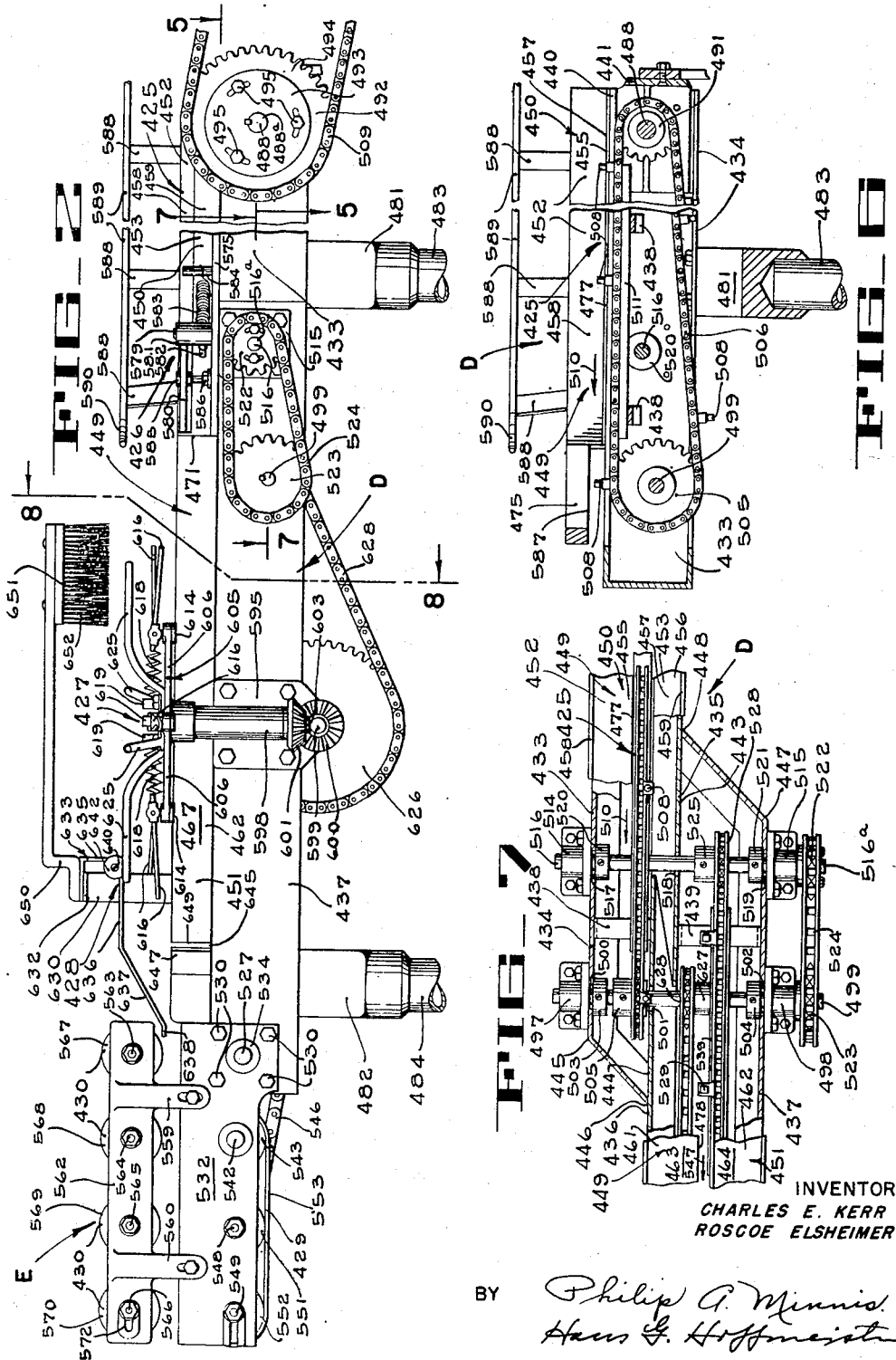
INVENTORS
CHARLES E. KERR
ROSCOE ELSHEIMER
BY Philip G. Minnis
Hans G. Hoffmeister
ATTORNEYS

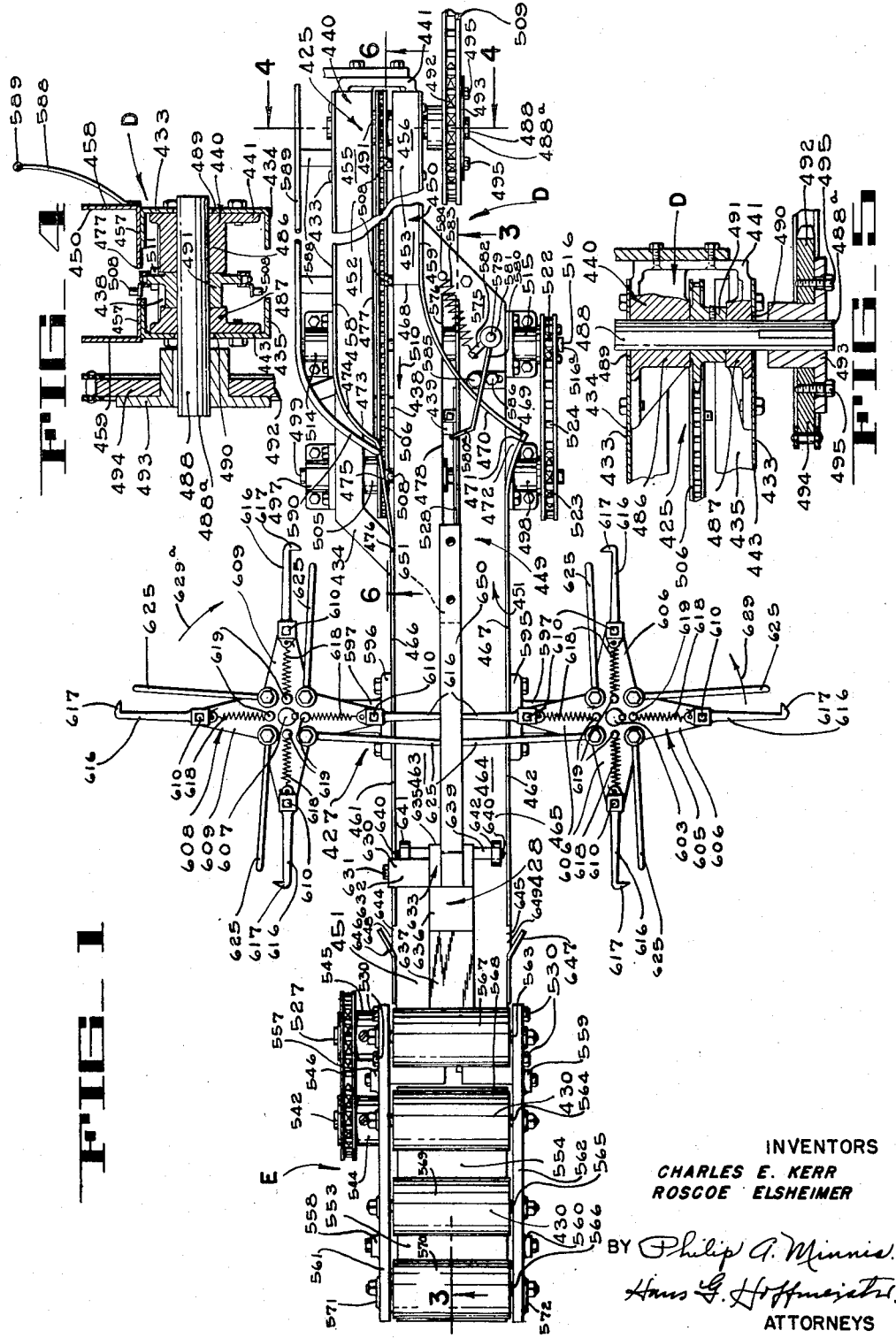

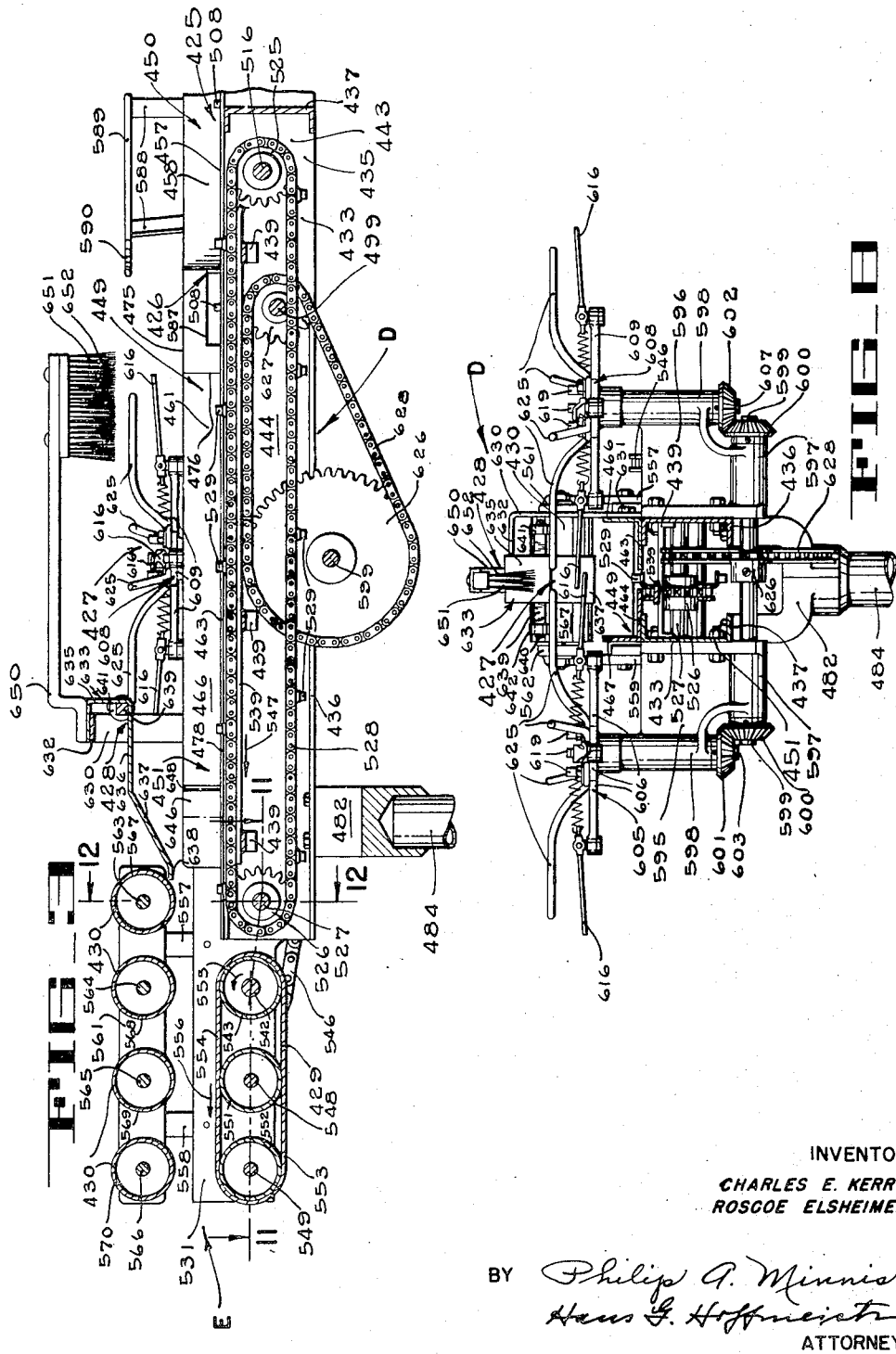

Aug. 25, 1953 — C. E. KERR ET AL — 2,649,676
APPARATUS FOR HANDLING CARTONS
Original Filed July 8, 1946 — 6 Sheets-Sheet 4
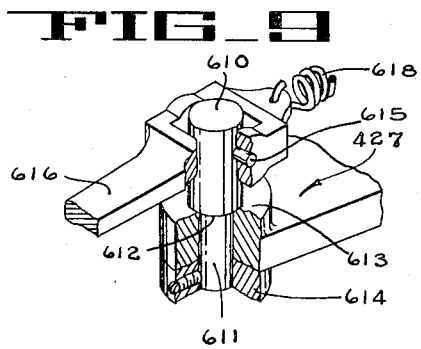
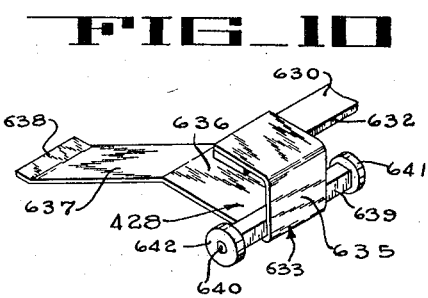
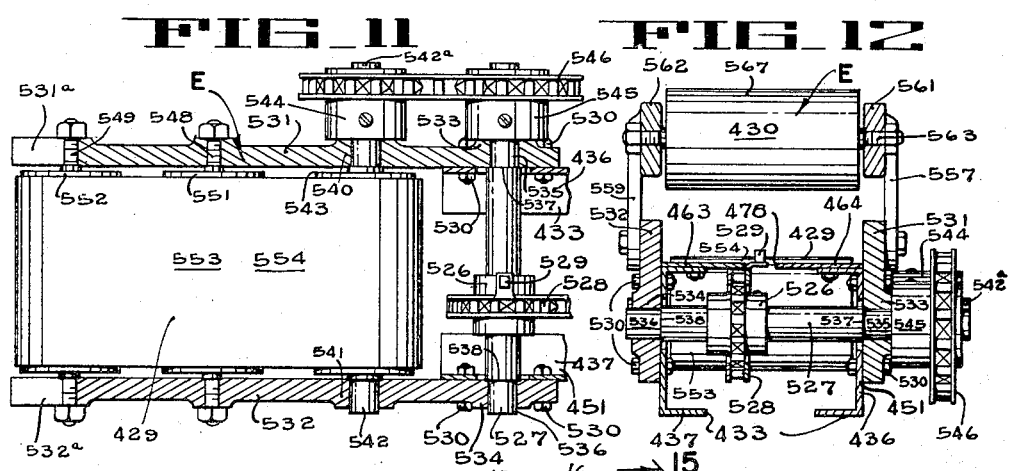
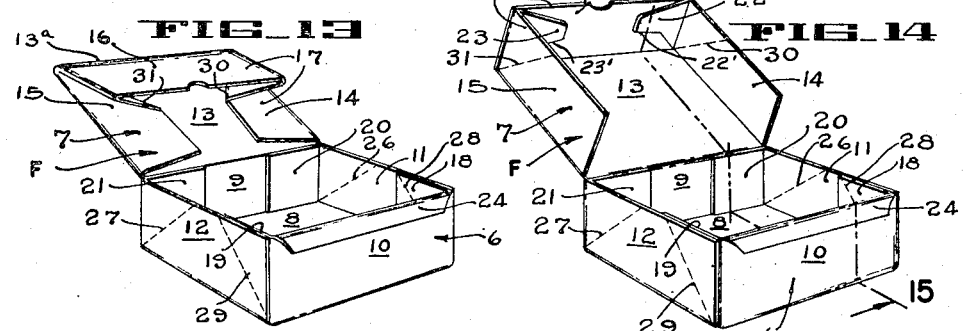
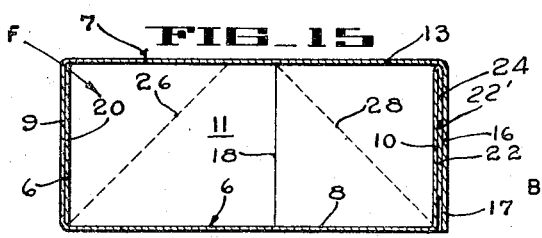
INVENTORS
CHARLES E. KERR
ROSCOE ELSHEIMER
BY
ATTORNEYS

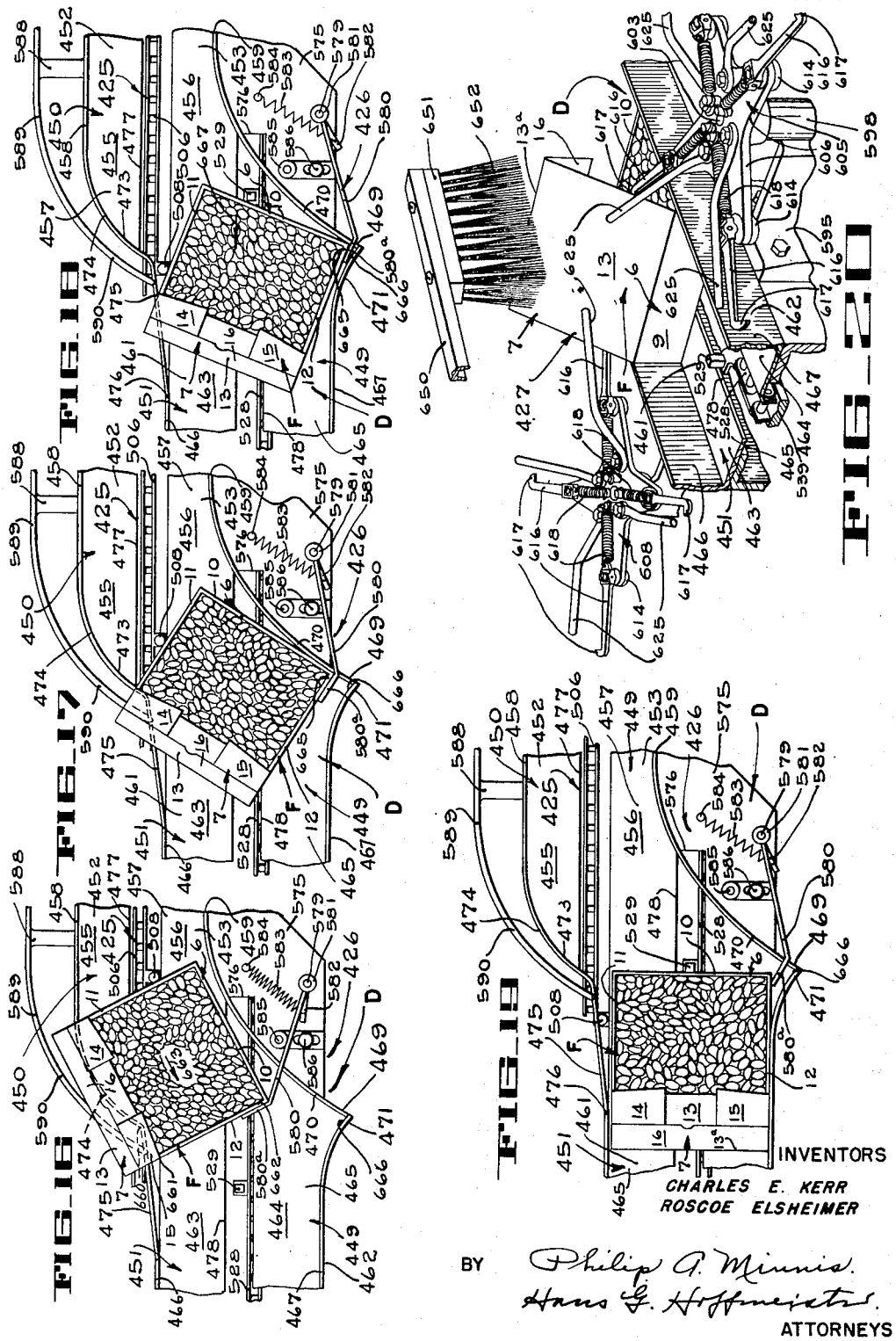

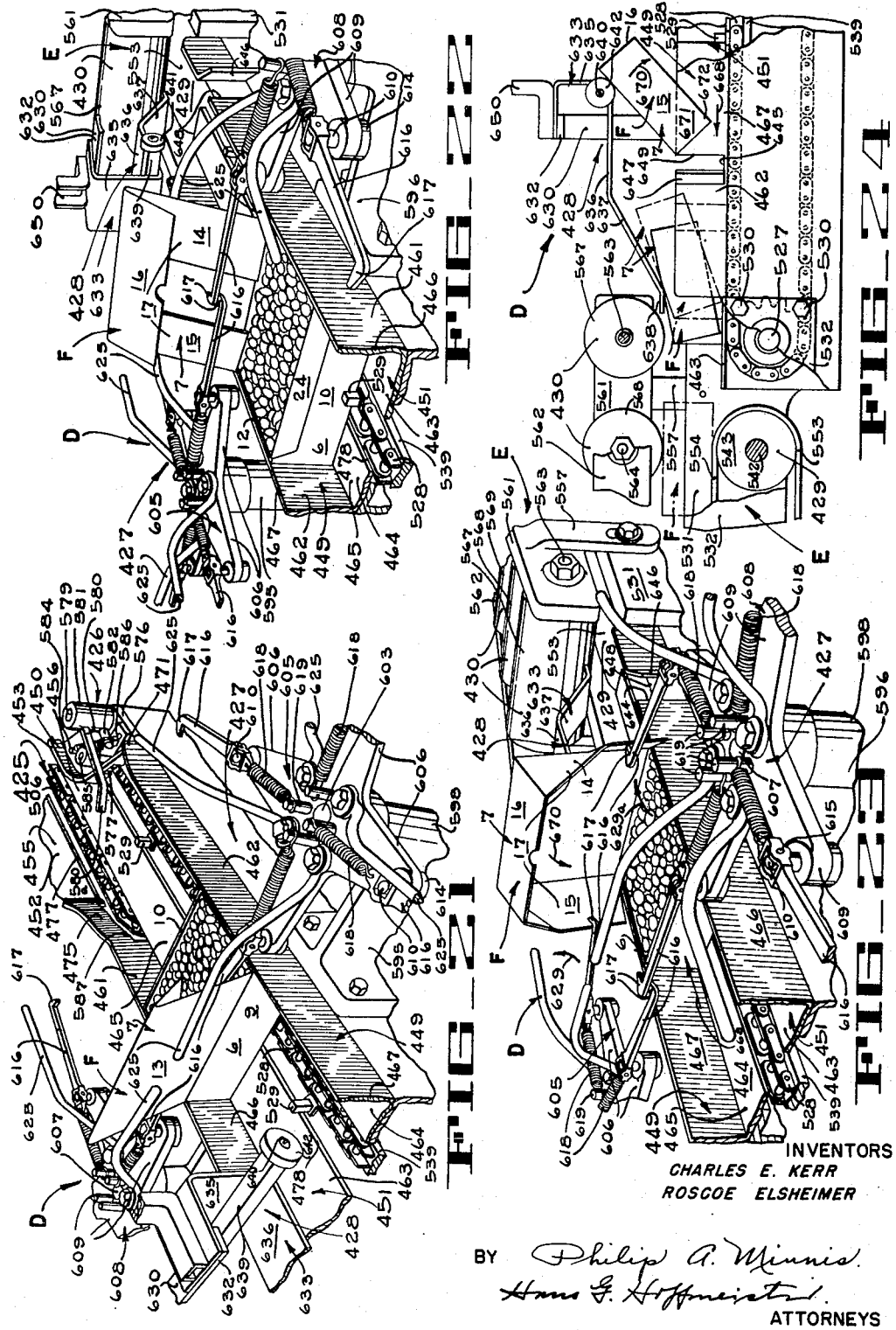

Patented Aug. 25, 1953

2,649,676

UNITED STATES PATENT OFFICE 2,649,676

APPARATUS FOR HANDLING CARTONS

Charles E. Kerr and Roscoe Elsheimer, Hoopeston, Ill., assignors to Food Machinery and Chemical Corporation, a corporation of Delaware Original application July 8, 1946, Serial No. 681,980. Divided and this application December 19, 1947, Serial No. 792,688

17 Claims. (Cl. 53—138)

The present invention appertains to an apparatus for handling cartons used for packaging merchandise such as food products or the like.

More particularly, the present invention relates to an apparatus for closing filled cartons having a formed body portion and a collapsed cover hinged thereon.

This application is a division of our copending application Ser. No. 681,980 for Carton Handling Machine filed July 8, 1946, now Patent Number 2,577,529, December 4, 1951.

One object of the present invention is to provide an apparatus for closing cartons having collapsed covers hinged thereon while the cartons are in a continuous uninterrupted flow.

Another object is to provide an apparatus for opening up the collapsed flanges of the covers of cartons and folding the covers over the cartons to thereby close the same while the cartons are in a continuous flow.

Another object is to provide a machine for closing cartons while the same are in a continuous and uninterrupted flow.

Another object is to provide a machine for advancing filled cartons in a continuous and uninterrupted flow past the carton closing and discharge mechanism for erecting the collapsed flanges of the cover of the cartons, for closing the cover, and for pressing the filled and closed cartons into shape for subsequent wrapping or labeling thereof.

Another object is to provide a machine for closing the covers of cartons after the cartons have been filled with merchandise and while the same are conveyed in a continuous and uninterrupted flow.

Another object is to provide a machine for closing the covers of cartons provided with collapsed flanges on their sides and for opening up and erecting said flanges prior to the closing of the covers.

Another object is to provide a machine for closing cartons which is fully automatic, continuous in operation, and of simple and inexpensive construction.

Other and further objects and advantages of the present invention will become apparent from the following description and drawings in which:

Fig. 1 is a plan view of the carton closing machine of the present invention and a carton discharge unit associated therewith.

Fig. 2 is a side view of the carton closing machine and discharge unit illustrated in Fig. 1, certain portions being omitted.

Fig. 3 is a longitudinal section of a portion of Fig. 1 taken along line 3—3 thereof.

Fig. 4 is a transverse section of Fig. 1 taken along line 4—4 thereof.

Fig. 5 is a horizontal section of the front end of the carton closing machine taken along line 5—5 of Fig. 2.

Fig. 6 is a longitudinal section of a portion of Fig. 1 taken along line 6—6 thereof.

Fig. 7 is a horizontal section of a portion of Fig. 2 taken along line 7—7 thereof, certain parts being shown in elevation.

Fig. 8 is a transverse section of Fig. 2 taken along line 8—8 thereof.

Fig. 9 is a perspective view of the universal mounting of one of the turret arms of the machine, certain parts being broken away while others are shown in section.

Fig. 10 is a perspective view of the cover closing mechanism of the machine.

Fig. 11 is a horizontal section of the carton discharge unit of the machine taken along line 11—11 of Fig. 3.

Fig. 12 is a transverse section of the carton discharge unit of the machine taken along line 12—12 of Fig. 3.

Fig. 13 is a perspective view of a carton prior to closing thereof, showing the flanges of the cover in folded and flattened condition and overlying the cover of the carton.

Fig. 14 is a perspective view of the carton illustrated in Fig. 13 but showing the flanges of the cover of the carton in opened or erected position.

Fig. 15 is a section of the carton shown in Fig. 14 taken along line 15—15 thereof with the cover disposed in closed position.

Figs. 16 to 19, inclusive, are diagrammatic plan views of a portion of the conveyor mechanism of the carton closing machine and the carton turning mechanism associated therewith illustrating in successive steps the turning of a filled carton thereby.

Figs. 20 to 23, inclusive, are perspective views of portions of the conveyor mechanism, the flap opening turrets, and other parts of the closing machine showing in successive steps the advancement of a filled carton past the turrets and the opening of the flaps of the cover of the carton thereby, portions of the carton discharge unit are illustrated in connection with Figs. 22 and 23.

Fig. 24 is a side elevation of a portion of the cover closing unit and a portion of the carton discharge unit of the machine showing a carton in different positions of advancement relative thereto and illustrating the manner in which the covers of cartons are closed thereby, certain portions of Fig. 24 are broken away.

To facilitate a clear understanding of the construction and operation of the machine of the present invention a brief description of the type of carton for which the machine is especially adapted is first given herein.

This carton (Fig. 13) is preferably made from a single blank of stock material such as cardboard, or the like, which is creased, bent, and glued to form a rectangular box which comprises a body portion 6 and a cover 7 hinged thereon. The body portion 6 includes a rectangular bottom 8, side walls 9 and 10, and end walls 11 and 12, while the cover or lid 7 hinged to the marginal edge of the side wall 9 includes a lid portion 13 provided with end flaps 14 and 15 and a side flap 16 forming a continuous flange 17. The side wall 10 of the carton is provided with tabs 18 and 19 bent at right angles thereto and glued or otherwise firmly secured to the end walls 11 and 12, respectively, while the end walls 11 and 12 are provided with tabs 20 and 21, respectively, bent at right angles thereto and glued or otherwise firmly secured to the side wall 9.

The end flaps 14 and 15 of the cover 7 are provided with tabs 22 and 23, respectively, which are bent at right angles thereto and glued or otherwise firmly secured to the side flap 16 of the cover 7. A locking tab 24 formed as an integral part of the side wall 10 and projecting outwardly and downwardly from the upper marginal edge thereof is provided to catch behind the straight edges 22' and 23' of the tabs 22 and 23 when the cover is closed with the flange 17, i. e., the flaps 14, 15, and 16 overlying the end walls 11 and 12 and the side wall 10, respectively, of the body portion of the carton so that the cover 7 is firmly held in closed position.

To permit easy shipment and handling of the cartons and to conserve as much shipping space as possible, the body portion 6 and the cover 7 of the cartons are creased and folded along lines 26 to 31 and the cartons are collapsed and flattened with the cover overlying the body portion of the cartons in a manner well known in the art and clearly illustrated in our copending application above referred to. In their collapsed and flattened condition the cartons are packed in stacks in shipping boxes in which they are shipped and distributed for use.

In use, the cartons are placed in stacks into a carton opening machine which turns back the covers 7 of the cartons, opens and sets up the body portions 6 thereof and feeds the cartons to a filling machine where they are filled and from which the filled cartons emerge with the end flaps 14 and 15 and the side flaps 16 of the cover in collapsed condition and overlying the underside of the lid portion 13 of the cover, as shown in Fig. 13. To close the cover of the cartons it is, therefore, necessary to open up and direct the end flaps 14 and 15 and the side flaps 16 (Fig. 14) and to close the cover 7 (Fig. 15) with the continuous flange 17 overlying the walls 10, 11, and 12 of the body portion 6 of the cartons and the edges 22' and 23' of the tabs 22 and 23 in locking engagement with the locking tab 24 of the side wall 10 so that the covers are locked in closed position to the body portion 6 whereby accidental opening of the cartons and spilling of the contents thereof during further handling of the cartons such as wrapping or labeling thereof is prevented.

The machine of the present invention has been designed to automatically perform this cover closing operation and while it is especially adapted for handling a particular type of carton referred to herein which is used for packaging frozen food products, it is to be understood, however, that the utility of the machine is not limited for use in connection with the particular carton referred to since other cartons for packaging food products or other merchandise may be effectively handled thereby provided, however, that the cartons to be closed require substantially the same operations for opening up or erecting the flaps of the cover and for closing the cover of the cartons specifically referred to in the above.

In general, the carton closing machine D of the present invention (Figs. 1, 2, and 3) comprises a conveyor mechanism 425, a carton turning mechanism 426, a flap opening mechanism 427, a cover or lid closing mechanism 428, and a carton discharge and presser unit E.

In the operation of the closing mechanism D, the filled cartons having their covers in open position are received endwise by the conveyor mechanism 425 from a filling machine and are advanced by the conveyor mechanism 425 past a carton turning mechanism 426 which turns the cartons so that during their further conveyance along the conveyor mechanism 425 they are advanced sidewise past the flap opening mechanism 427 where the continuous flange 17 of the cover, i. e., the end flanges 14 and 15 and the side flanges 16 are opened and erected from the position shown in Fig. 13 to the position shown in Fig. 14. Thereupon during further advancement of the cartons by the conveyor mechanism 425 past the cover closing mechanism 428, the covers 7 of the cartons are swung to substantially closed position with the continuous flange 17 thereof overlying the walls 10, 11, and 12 of the body portions 6 of the cartons.

After the covers of the cartons have been substantially closed, the cartons are presented to the carton discharge and pressure unit E which comprises a discharge conveyor 429 and a plurality of presser rolls 430. The discharge conveyor 429 advances the cartons past the presser rolls 430 which force the covers into finally closed position with the edges 22' and 23' of tabs 22 and 23 into locking engagement with the locking tab 24, and press the cartons into correct rectangular shape. Thereupon, the closed cartons are discharged by the conveyor 429 from the machine preferably directly into a wrapping and labeling machine where the cartons are wrapped and labeled. Finally the wrapped and labeled cartons are packed into shipping boxes in the manner well known in the art.

The conveyor mechanism 425 (Figs. 1 to 8) comprises a frame structure 433 formed by a plurality of U channels 434, 435, 436, and 437. The U channels 434 and 435 (Figs. 2, 4 to 7, inclusive) are disposed in horizontal position at the front end of the carton closing unit D and are secured in parallel and spaced relation with respect to each other by means of transverse braces 438 (Fig. 6) while the U channels 436 and 437 are horizontally disposed intermediate the U channels 434 and 435 and the discharge and presser unit E and are secured to each other in parallel and spaced relation by means of a plurality of transverse braces 439 (Figs. 3 and 8). Secured to the front ends 440 of the U channels 434 and 435 (Figs. 1, 4, and 6) is a U-shaped bracket 441 which is secured to the frame structure of the outlet conveyor of a filling machine or the like.

The U channels 434 and 437 are arranged in such a manner (Fig. 7) that channels 435 and 436 are in longitudinal alignment with respect to each other with the web portions 443 and 444 thereof disposed at opposite sides. The rear portion of the U channel 434 is bent inwardly, as shown at 445 and the rear end 446 thereof is secured to the U channel 436 in any desired manner, such as welding or the like. The front end of the U channel 437 is bent inwardly, as shown at 447 and the rear end 448 thereof is secured to the U channel 435 in any convenient manner. Mounted upon the frame structure 433 is a conveyor table 449 comprising a front portion 450 and a rear portion 451. The front portion 450 is formed by a pair of L channels 452 and 453 arranged adjacent each other in spaced and parallel relation with the flanges 455 and 456 thereof horizontally disposed and forming a longitudinally extending table surface 457 while the vertically disposed flanges 458 and 459 of the channels 452 and 453, respectively, form the guide walls of the table portion 450.

The rear portion 451 of the conveyor table 449 (Figs. 1, 3, and 8) is formed by a pair of L channels 461 and 462 which are arranged in spaced and parallel relation with their flanges 463 and 464 horizontally disposed and forming a longitudinally extending table surface 465 while the vertically extending flanges 466 and 467 of the L channels 461 and 462, respectively( form the guide walls of the rear table portion 451. The L channels 452, 453, and 461, 462 are firmly secured to the frame structure 433 in such a manner that the horizontal flange 463 of the L channel 461 (Fig. 1) forms the continuation of the horizontal flange 456 of the L channel 453, while the L channels 452 and 462 are disposed in spaced and parallel relation at opposite sides thereof. The vertical flange 459 of the L channel 453 extends beyond the rear end 468 of the horizontal flange 456 and is curved outwardly terminating at 469 (Fig. 1). The front end of the horizontal flange 464 of the L channel 462 is fitted against the curved portion of the vertical flange 459 of the L channel 453, as shown at 470, while the front end of the vertical flange 467 of the L channel 462 is curved outwardly, as shown at 471, and is joined to the rear end 469 of the flange 459 to form a continuous guide wall therewith. A gusset plate 472 is welded to the flanges 459, 467, and 464 so as to close the open space at the junction of the flanges 459 and 467.

The rear end of the horizontal flange 455 of the L channel 452 is curved, as shown at 473, and the vertical flange 458 is curved inwardly toward the channel 461, as shown at 474, and extends backwardly, as illustrated at 475, terminating at 476, while the front portion of the vertical flange 466 of the L channel 461 is cut away and the rear portion thereof is joined with the rear end 476 of the flange 458 so as to form a continuous guide wall therewith. The horizontal flanges 455, 456, and 463 of the L channels 452, 453, and 461, respectively, are so arranged with respect to each other as to provide an opening 477 extending longitudinally of the table surface 457. Likewise, the horizontal flanges 463 and 464 of the L channels 461 and 462 are arranged in spaced relation so as to provide an opening 478 extending longitudinally of the table surface 465.

From the above it will, therefore, be seen that the horizontal flanges of the L channels 452, 453, and 462, 463 form a continuous conveyor table provided with guide walls at the sides thereof established by the vertical flanges of said channels so that a trough or channel is formed along which the cartons are advanced in the manner as hereinafter described. The front portion of the conveyor trough is of sufficient width to receive the cartons endwise therein while the rear portion of the trough is considerably wider to permit advancement of the cartons sidewise therein. It will be further noted that due to the disposition of the various L channels and the configuration of their flanges a curved pathway is formed intermediate the front portion 450 of the conveyor table 449 and the rear portion 451 thereof so that the cartons received by the front portion of the conveyor table are gradually switched over to the rear portion of the table during their conveyance therealong. The front portion 450 of the conveyor table (Fig. 1) is preferably of considerable length so as to serve as an inspection table enabling an operator standing beside the same to inspect the cartons and remove improperly filled cartons or damaged cartons from the machine during the continuous operation thereof.

Secured to the lower flanges of the U channels 434 and 435 (Figs. 2 and 6) substantially halfway between the front and rear ends of the frame structure 433 is a yoke 481, while attached to the lower flanges of the U channels 436 and 437 at the rear end of the frame structure 433 is a yoke 482 (Figs. 2, 3, and 8). Secured to the yokes 481 and 482 are standards 483 and 484, respectively, provided with flanges (not shown) at their lower ends by which the standards are secured to the floor or foundation on which the machine is placed.

The bracket 441, previously referred to (Figs. 4 and 5), is provided with bearings 486 and 487 within which a transverse shaft 488 extending through openings 489 and 490 in the web portions of the U channels 434 and 435 is rotatably mounted. Fixed to the shaft 488 for rotation therewith and disposed intermediate the bearings 486 and 487 is a sprocket 491, while keyed to the free end 488a is a sprocket 492 comprising a flanged hub portion 493 and a body portion 494 adjustably secured relative to each other by means on a slot and cap screw arrangement 495, well known in the art to permit rotative adjustment of the sprocket 492 relative to the shaft 488.

Secured to the U channels 434 and 437 (Fig. 7) are bearings 497 and 498 within which a transverse shaft 499 is rotatably mounted. This shaft extends through openings 500, 501, and 502 in the web portions of the U channels 434, 436, and 437 and is provided with retaining collars 503 and 504 fixed thereto and bearing against the web portions of the U channels 434 and 437, respectively, for maintaining the shaft 499 in proper position within the bearings 497 and 498. Fixed to the shaft 499 is a sprocket 505 and trained around the same and the sprocket 491 (Figs. 6 and 7) is an endless conveyor chain 506 provided with a plurality of pusher members 508 spaced with respect to each other a distance in excess of the length of the cartons to be handled thereby. These pusher members extend upwardly through the opening 477 of the table portion 450 a sufficient distance above the table surface 457 so as to engage the cartons supported upon the same and to advance them therealong in the manner as will be described later on.

Trained around the sprocket 492 (Figs. 1 and 2) and a sprocket (not shown) of the filling machine is an endless drive chain 509 so that upon operation of the filling machine the shaft 488 and sprocket 491 are continuously driven and the conveyor chain 506 is continuously operated in the direction of arrow 510 (Figs. 1, 6, and 7). Secured to the transverse braces 438 directly below the upper run of the conveyor chain 506 intermediate the sprockets 491 and 505 is a chain guide 511 (Fig. 6) for supporting the upper run of the conveyor chain in horizontal position and to prevent sagging thereof.

Secured to the U channels 434 and 437 intermediate the shafts 488 and 499 are bearings 514 and 515 (Fig. 7) within which a transverse shaft 516 is rotatably mounted. This shaft extends through openings 517, 518, and 519 in the web portions of the U channels 434, 435, and 437 and fixed to the same are retaining collars 520 and 521 engaging the web portions of the channels 434 and 437 for maintaining the shaft in proper position within the bearings 514 and 515. Fixed to the end 516a of the shaft 516 is an adjustable sprocket 522 (Figs. 1, 2, and 7) which is of the same construction as the sprocket 492, previously referred to. Trained around the sprocket 522 and a sprocket 523 keyed to the shaft 499 is an endless chain 524 (Figs. 2, and 7). Fixed to the shaft 516 for rotation therewith is a sprocket 525 and trained around the same and a sprocket 526 (Figs. 3, 11, and 12) keyed to a transverse shaft 527 at the rear end of the frame structure 433, is an endless conveyor chain 528 provided with a plurality of spaced pusher members 529.

The pusher members 529 extend upwardly through the longitudinally extending opening 473 of the rear portion 451 of the conveyor table 449 and project a sufficient distance above the table surface 465 so as to engage the cartons supported thereon and to advance the same therealong upon operation of the conveyor chain 528. The pusher members 529 are spaced with respect to each other sufficiently so as to receive the cartons sidewise therebetween.

Secured to the rear end of the U channels 436 and 437 of the frame structure 433 by means of bolts 530 (Figs. 1, 2, 11, and 12) are castings 531 and 532 which form a part of the frame structure of the carton discharge and pressure unit E. The front ends of these castings which overlie the web portions of the U channels 436 and 437 are provided with bearings 533 and 534 within which the transverse shaft 527, previously referred to, is rotatably mounted. The end portions 535 and 536 of the shaft 527 disposed within the bearings 533 and 534 are of reduced diameter so that shoulders 537 and 538 are formed which engage the inner side of the castings 531 and 532, respectively, whereby the shaft is maintained in proper position within the bearings 533 and 534.

Mounted upon the transverse braces 439 directly below the upper run of the conveyor chain 528 (Fig. 3) is a chain guide 539 which maintains the upper run of the conveyor chain 528 in substantially horizontal position and prevents sagging of the same.

Rotatably mounted within bearing portions 540 and 541 (Fig. 11) of the casting 531 and 532 is a transverse shaft 542 to which a roller 543 is fixed for rotation therewith. Fixed to the free end 542a of the shaft 542 is a sprocket 544 and trained around the same and a sprocket 545 fixed to the reduced end of the shaft 527 is an endless drive chain 546.

From the above it will, therefore, be seen that upon operation of the conveyor chain 506 and shaft 499, shaft 516 is driven simultaneously therewith in view of the driving connection established by means of the sprockets 523, 522, and chain 524. The rotation of the shaft 516 and sprocket 525 effects operation of the conveyor chain 528 in the direction of arrow 547 (Figs. 3 and 7) so that the pusher members 529 of the upper run of the chain 528 are caused to travel continuously toward the discharge unit E and effect advancement of the cartons along the rear portion 451 of the conveyor table 449.

Fixed to the castings 531 and 532 are further transverse rods 548 and 549 upon which transverse rolls 551 and 552 are rotatably mounted. Trained around the rolls 543, 551, and 552 is an endless conveyor belt 553, the upper run 554 of which is disposed in substantially horizontal alignment with respect to the table surface 465 of the rear portion 451 of the conveyor table 449.

Upon operation of the conveyor chain 528, in the manner previously referred to, shaft 527 will be rotated therewith and effects a corresponding rotation of the shaft 542 and roll 543 through sprockets 545, 544, and drive chain 546. The rotation of the roll 543 in the direction of arrow 555 (Fig. 3) effects travel of the conveyor belt 553 in the direction of arow 556 (Fig. 3) and a corresponding rotation of the rolls 551 and 552 therewith so that the cartons which arrive at the rear end of the conveyor table 449 are transfered by the pusher members 529 upon the conveyor belt 553 and are advanced thereby through the carton discharge and presser unit E. The transverse rod 549 is adjustably disposed in slots 531a and 532a (Fig. 11) to permit adjustment of the roll 552 for taking up any slack in the conveyor belt 553.

Mounted above the castings 531 and 532 by means of adjustable vertical supporting straps 557, 558, 559 and 560 are horizontally disposed supporting members 561 and 562 arranged in spaced relation a predetermined distance above the castings 531 and 532. Fixed within the supporting members 561 and 562 (Figs. 2, 3, and 12) are a plurality of transverse rods 563, 564, 565, and 566 disposed in spaced relation with respect to each other upon which presser rolls 567, 568, 569, and 570 are rotatably mounted. These presser rolls extend transversely with respect to the conveyor belt 553 and are disposed a predetermined distance above the same, i. e., a distance corresponding to the height of the cartons so that the rolls 567 to 570 engage the upper surface of the cover 7 of the cartons and exert a slight downward pressure upon the same to effect a complete closing of the cover and interlocking of the straight edges 22' and 23' of the tabs 22 and 23 with the locking flap 24. The rolls 568, 569, and 570 are in vertical alignment with the rolls 543, 551, and 552, respectively, and the transverse rod 566 is adjustable within slots 571 and 572 (Figs. 1 and 2) of the members 561 and 562 so that the roll 570 may be adjusted and maintained in correct alignment with the roll 552 upon adjustment of the latter, as previously stated herein.

Secured to the front portion of the U channel 437 (Figs. 1 and 2) and the inwardly bent portion 447 thereof is a cover plate 575 (Fig. 1) provided with a slot 576 which forms the continuation of the opening 478 of the rear portion 451 of the conveyor table 449 so that the plate 575 will not interfere with the operation of the pusher members 529 of the conveyor chain 528. Likewise, the vertical flange 459 is cut out, as shown at 577 (Fig. 21), so as to permit travel of the pusher members 529 past this flange without interfering therewith.

Fixed to the plate 575 (Figs. 1, 2, and 21) is a vertically disposed pivot stud 579 upon which a carton turning arm 580 is freely pivoted by means of a sleeve like hub portion 581 provided with a radially extending pin 582 to which one end of a coil spring 583 is attached, the other end of which is secured to the plate at 584. The carton turning arm 580 extends over the vertical flange 459 of the L channel 453 into the path of the cartons on the conveyor table 449 and engages the cartons about half way between the top and the bottom thereof. To permit the extension of the arm 580 over the flange 459 the height of the latter is sufficiently reduced, as clearly shown in Fig. 21. The arm 580 is normally held in the position shown in Fig. 1 in which it abuts against an abutment 585 adjustably carried by the plate 575 by means of a bolt and slot ararngement 586. The free end 580a of the carton turning arm 580 is angularly disposed with respect to the remaining portion of the arm and adapted to engage the front end 12 of each carton during its transfer from the front portion 450 of the conveyor table to the rear portion 451 thereof and to effect the turning of the cartons from lengthwise to sidewise position so that they are subsequently advanced sidewise past the flap opening mechanism 427 and the cover closing mechanism 428 into the discharge and presser unit E.

It is further to be noted that the inwardly curved and rearwardly extending portions 474 and 475 of the flange 458 of the L channel 452 (Figs. 3 and 6) are provided with a cut out portion 587 so as to porvide sufficient clearance for the pusher members 508 and to prevent interference thereof with the guide wall 458.

Secured to the flange 458 of the L channel 452 (Figs. 1, 2, 3, 4, and 6) by means of a plurality of supporting brackets 588 is a cover supporting rod 589 disposed parallel to the front portion 450 of the conveyor table. The rear end of the rod 589 is curved inwardly toward the rear portion 451 of the conveyor table 449, as shown at 590 in Fig. 1. This rod 589 is disposed exteriorly of the front portion 450 of the conveyor table 449 and is arranged in spaced relation relative to the guide wall 458 in horizontal and vertical directions (Fig. 4) so that when a carton is advanced endwise along the table portion 450 the open cover or lid of the carton F is supported by the rod 589.

Secured to the web portions of the U channels 436 and 437 of the frame structure substantially halfway between the carton discharge and presser unit E and the carton turning finger 580 (Figs. 1, 2 and 8) are turret supporting brackets 595 and 596, respectively. Both of these brackets are of identical construction and each comprises a horizontally disposed bearing portion 597 and a vertically disposed bearing portion 598. Rotatably mounted within the bearing portions 597 and extending transversely of the machine below the frame structure 433 is a shaft 599 provided with a bevel gear 600 at each of its ends. The bevel gears 600 are fixed to the shaft 599 for rotation therewith and are adapted to intermesh with bevel gears 601 and 602, respectively. The bevel gear 601 is fixed to a vertically disposed shaft 603 which is rotatably mounted within the bearing portion 598 of the turret supporting bracket 595 and keyed to the upper end of the shaft 603 is a turret 605 provided with a plurality of spider arms 606. The bevel gear 602 (Fig. 8) is fixed to a vertical shaft 607 rotatably mounted within the bearing portion 598 of the turret supporting bracket 596 and fixed to the upper end of the shaft 607 for rotation therewith is a turret 608 provided with a plurality of spider arms 609.

Rotatably mounted adjacent the outer end of each of the spider arms 606 and 609 of the turrets 605 and 608, respectively (Fig. 9) are pivot pins 610, the lower portion 611 of which is of reduced diameter so that a shoulder 612 is formed engaging a bearing surface 613 of the spider arms, while secured to the lower end of the reduced portion 611 of each pin is a retaining collar 614 for maintaining the pivot pin 610 in position without preventing free rotation thereof. Pivotally secured to the upper end of each pivot pin 610 by means of a transverse pivot pin 615 is a flap or flange opening arm 616 provided with a hook 617 (Figs. 1 and 21) at its outer end. Secured to the rear end of each arm 616 adjacent the pivot 610 is one end of a coil spring 618, the other end of which is attached to a stud 619 fixed to the turrets 605 and 608.

From the above it will, therefore, be seen that the turret arms 616 are mounted for universal movement on the spider arms 606 and 609, but are normally held in substantially horizontal position radially disposed to the turret structure with which they are associated and in alignment with the spider arms thereof by means of the coil springs 618. The springs 618 of opposing turrets are secured to the studs 619 at different heights (Fig. 8) so that the arms 616 of the turret 605 are slightly downwardly inclined and the arms 616 of the turret 608 are slightly upwardly inclined with respect to horizontal and will not interfere with each other upon rotation of the turrets. Fixed on the turrets 605 and 608 adjacent each stud 619 is a cover engaging and supporting arm 625. One arm 625 is associated with each flange opening arm 616 and is disposed in spaced and fixed relation with respect thereto at the hook side of each flange opening arm.

Each turret is preferably provided with four spider arms, four flange opening arms, and four cover engaging and supporting arms. If desired, however, the number of the same may be increased or reduced, as will be obvious to those skilled in the art. The turrets 605 and 608 are so disposed and in such rotative adjustment with respect to each other that the arms 616 and 625 of opposing turrets cooperate with each other during the rotation of the turrets.

Fixed to the shaft 599 (Figs. 2, 3, and 8), previously referred to, is a sprocket 626, and trained around the same and a sprocket 627 fixed to the shaft 499 (Figs. 3 and 7) is an endless drive chain 628 so that upon rotation of the shaft 499 the shaft 599 is rotated in timed relation therewith and rotation of the turrets 605 and 608 in timed elation and in opposite directions, i. e., in the direction of arrows 629 and 629a (Fig. 1), is obtained.

Arranged intermediate the turrets 605 and 608 and the carton discharge and presser unit E (Figs. 1, 2, 3, 8, and 10) is the cover closing unit 428 which is supported above the rear portion 451 of the conveyor table 449 by means of a supporting bracket 630 fastened to the flange 466 of the L channel 461 and the web portion of the U channel 436 by means of cap screws 631. The bracket 630 is of L-shaped construction and the leg portion 632 thereof extends transversely of the rear portion 451 of the conveyor table 449 at a predetermined distance above the same. Secured to the portion 632 is a cover guide and closing plate 633 which comprises a vertically disposed downwardly extending portion 635, a horizontally disposed rearwardly extending portion 636, the rear end 637 of which is inclined downwardly toward the presser roll 567, and terminates in a horizontally disposed portion 638 adjacent the same. Secured to the cover guide plate 633 intermediate the portions 635 and 636 thereof is a bar 639 (Fig. 10) which extends transversely with respect to the conveyor mechanism of the machine. Rotatably mounted on the free ends of the bar 639 by means of screws 640 are cover closing rolls 641 and 642 which are adapted to engage the cover of the carton and fold the same over the carton to partially close the same (Fig. 24) during the advancement of the cartons therepast while the downwardly inclined portion 637 of the cover guide plate 633 effects the final closing of the cover of the carton and guides the same beneath the first presser roll 567 so as to assure correct introduction of the carton into the presser and discharge unit E.

During the initial cover closing operation, as shown in Fig. 24, the lower portions of the end flaps of the cover are disposed outside the guide walls 466 and 467 of the conveyor table 449 and must be introduced into the guide channel of the conveyor before the cover can be completely closed. To obtain the introduction of the end flaps of the cover of the carton into the conveyor channel the guide walls 466 and 467 are cut open, as shown at 644 and 645 (Figs. 1, 2, 23, and 24), and the portions of the guide walls adjacent said cuts are bent outwardly, as shown at 646 and 647, respectively, so that openings 648 and 649 are formed. These outwardly bent portions 646 and 647 of the guide walls facilitate the introduction of the end flaps of the carton cover through the openings 648 and 649 into the conveyor channel incident to the cover closing operation and the advancement of the cartons therepast.

Secured to the bracket portion 632 of the cover closing station 428 is a brush supporting arm 650 (Figs. 1, 2, 3, and 8) which extends rearwardly above the rear portion 451 of the conveyor table 449 in spaced relation thereto and parallel to and above the path of travel of the pusher members 529. Secured to the free end of the arm 650 is a brush 651 which extends longitudinally of the front portion of the arm parallel to the path of travel of the pusher members 529. The brush 651 is provided with downwardly extending comparatively long and soft bristles 652 which are adapted to engage the open cover 13 (Fig. 20) of the carton and to position the same correctly for introduction thereof between the cooperating arms 616 and 625 of the turrets 605 and 608, as will be more fully described later on. The brush 651 is positioned at such height above the conveyor table 449 that the bristles 652 engage only the upper edge 13a of the open cover 13 and exert only a slight pressure or backward drag against the same to thereby gently tilt the cover 13 into the desired position while the cartons are advanced beneath and past said brush.

*Operation*

During the operation of the machine the shaft 488 of the closing unit is continuously driven by the filling machine by means of the sprocket chain 509 whereby continuous operation of the conveyor chains 506 and 528 and the discharge belt 553 in the direction of arrows 510, 547, and 556 (Figs. 1, 3, and 6) is effected, while the turrets 605 and 608 are continuously rotated in the direction of arrows 629 and 629a (Fig. 1) in timed relation therewith.

The filled cartons, having their covers disposed in open position, are received endwise from the outlet conveyor of the filling machine by the front portion 450 of the conveyor table 449 (Fig. 1) and are advanced endwise in spaced relation and in a single file along the same by the pusher members 508 while the open covers of the cartons are supported by and slide along the cover supporting rod 589. As each carton approaches the bent portion 660 (Fig. 16) of the conveyor trough, the edge 661 of the body portion 6 of the carton engages and travels along the inwardly curved portion 474 of the guide wall 458 whereby the filled carton F is turned and shifted into a position, as shown in Fig. 16, in which the end wall 12 of the carton engages the carton turning arm 580, as shown at 662. As soon as the carton arrives in this position, and while the pusher member 508 engaging the end wall 11 of the carton continues its forward movement in the direction of arrow 663 (Fig. 16), the carton is further advanced and, since its forward movement is retarded by the arm 580, the carton is turned from its position, shown in Fig. 16, first to the position shown in Fig. 17 and finally to the position illustrated in Fig. 18 by the combined action of the pusher member 508 and arm 580 and is gradually transferred from the portion 450 to the portion 451 of the conveyor table 449. To facilitate easy turning of the carton in the manner above described, the carton engaging portion of the pusher members 508 are preferably made cylindrical, as shown in Fig. 6.

In view of the force applied by the pusher member 508 which tends to urge the carton forwardly along the conveyor table 449, the arm 580 is traversed from the position shown in Fig. 16, to the position in Fig. 17, and finally to the position as shown in Fig. 18 against the tension of the coil spring 583 so that while the end wall 11 of the carton is advanced by the pusher member 508 the forward movement of the end wall 12 of the carton is retarded and the carton is pulled toward the curved guide wall portion 470 of the guide wall 459 and the corner 665 of the body portion 6 of the carton (Figs. 17 and 18) enters into the outwardly projecting corner 666 of the conveyor channel formed by the outwardly curved portions 470 and 471 of the guide walls 459 and 467. This outwardly extending corner 666 of the conveyor channel provides sufficient room for the carton to turn from endwise to substantially sidewise position.

While the carton is now in the position as shown in Fig. 18, one of the pusher members 529 of the conveyor chain 528 engages the side wall 10 of the body portion 6 of the carton and exerts a forward pressure upon the same in the direction of arrow 667 (Fig. 18) whereby the carton is further turned in counterclockwise direction and its end wall 11 is disengaged from the pusher member 508 of the conveyor chain 506, while the end wall 12 of the carton bears against the angularly disposed portion 580a of the arm 580 and pivots about the same. Consequently, in view of the forward movement imparted to the carton by the pusher member 529 and the pivotal movement of the carton about portion 580a of the arm 580, the carton is turned into complete sidewise position within the conveyor channel, as shown in Fig. 19, and is now advanced by the pusher member 529 along the rear portion 451 of the conveyor table 449, while the end wall 12 of the carton disengages from the arm 580 which thereupon returns to its original position into contact with the abutment 585 under the urge of the coil spring 583.

The spacing of the pusher members 508 and 529 and the speed of travel of the conveyor chains 506 and 528 are such as to effect the correct turning of the carton and its transfer from the front portion 450 to the rear portion 451 of the conveyor table 449 without interference by the pusher members 508 and 529.

While the carton is now advanced along the rear portion 451 of the conveyor table 449 with the open cover 7 disposed in upwardly inclined and leading position, the brush 651 engages the upper edge 13a of the cover and tilts the same slightly backward to the position as shown in Fig. 20 so that as the carton now approaches and moves past the continuously rotating flange or flap opening turrets 605 and 608, the cover 7 is held in such position that is will be received between the opposing arms 616 and 625 of the turrets which are rotated in the directions of arrows 629 and 629a, respectively, and in such timed relation with respect to the conveyor chain 528 and the carton advanced thereby that the cover 7 of the carton will freely enter the space between these arms, as shown in Fig. 20. While the advancement of the cartons and the rotation of the turrets 605 and 608 continues, the cover is turned forward by the combined action of the opposing pairs of arms 616, 625 into the position as shown in Figs. 21 and 22 at which time the cooperating arms 616 of the turrets are disposed substantially parallel to each other with the hook portions 617 thereof disposed above each other and contacting the inner surface of the lid portion 13 of the cover (Fig. 22). During further advancement of the carton from the position shown in Fig. 22 to the position illustrated in Fig. 23 and while the turrets 605 and 608 continue their rotation in the direction of arrows 629 and 629a, respectively (Fig. 23), the hook portions 617 of the arms 616 engage the end flaps 14 and 15 of the carton and pull them outwardly thereby erecting the same. In view of the fact that the side flap 16 is connected with the end flaps 14 and 15 and folded over the same, it is also erected incident to the erection of the end flaps 14 and 15. As the advancement of the carton by the pusher member 529 and the rotation of the turrets 605 and 608 in the direction of arrows 629 and 629a, respectively (Fig. 23) continues, the lower portion of the end flaps 14 and 15 is pulled outwardly beyond the guide walls 466 and 467 by the hooks 617 of the arms 616 in the manner as clearly shown in Fig. 23, while the arms 616 of the turrets yield pivotally relative to the spider arms supporting the same against the tension of the springs 618 into the position as shown in Fig. 23 and are maintained in engagement with the end flaps 14 and 15 by the action of the springs 618.

As soon as the carton arrives in the position ilustrated in Fig. 23, the cover closing rolls 641 and 642 of the cover closing mechanism 428 engage the outer surface of the cover 13, and as the carton continues to travel in the direction of arrow 668 (Figs. 23 and 24) they begin to close the cover, i. e., to swing the same downward in the direction of arrow 670 (Figs. 23 and 24). As soon as the carton has past the position as shown in Fig. 23, the turret arms 616 disengage from the end flaps 14 and 15 of the cover which now snap back so that the lower portions of these flaps engage the outer surfaces of the guide walls 466 and 467 substantially as shown at 671 in Fig. 24, while the arms 616 swing back into radial positions with respect to their turrets under the action of the coil springs 618. As the carton now continues its advancement with the lower ends of the end flaps 14 and 15 sliding along the outer side walls of the guides 466 and 467 (Fig. 24), the cover 7 is closed further by the rolls 641 and 642 and, as soon as the lower portions 672 of the end flaps are adjacent the openings 648 and 649 of the guide walls 466 and 467 and travel past the same, they are guided back into the conveyor trough by the flap guides 646 and 647. With the end flaps of the cover now disposed within the conveyor channel the cover of the carton is closed by the rear end 637 of the cover guide plate 633 in the manner as diagrammatically illustrated in full and dotted lines in Fig. 24 and the carton is thereupon introduced into the carton discharge and presser unit E and transferred upon the conveyor belt 553 thereof by the pusher member 529. The carton is now advanced by the conveyor belt 553 past the presser rolls, 567, 568, 569, and 570 and is subsequently discharged from the machine. The presser rolls 567 to 570 are so adjusted relative to the rear end of the conveyor table 449, rolls 543, 551, 552, and the belt 553 as to exert in cooperation with the rear end portion 638 of the closing plate 633 sufficient pressure upon the cover of the carton to completely close the same and to interlock the straight edges 22' and 23' of the tabs 22 and 23 with the locking tab 24. While the carton is advanced by the discharge belt 553 between the rolls 543, 551, 552, and presser rolls 567 to 570 it is pressed into shape to eliminate any bulging of the bottom or cover of the carton. The cover is now completely closed and held in locked position on the body portion of the carton and is prevented from opening during discharge of the carton from the machine and subsequent handling, such as wrapping or labeling thereof.

In the continuous operation of the carton closing discharge unit of the machine the cartons are continuously advanced in a single file and in spaced relation along the conveyor table 449 and are discharged from the discharge and pressure unit E and the operations described herein in connection with a single carton are repeated with respect to each carton advanced through the machine.

The machine of the present invention is especially adapted for handling the particular type of carton described herein which is designed for packaging frozen food products, or the like. It is to be understood, however, that the utility of the machine is not limited for use in connection with the particular carton specifically described herein, since other cartons for packaging food products or other merchandise may be effectively handled thereby provided that the end flange and side flanges of the cover of the carton are folded and collapsed in a similar manner and require substantially the same operations for opening the cover and for closing the cover of the carton as the specific type of carton referred to herein.

While we have shown and described a preferred apparatus and a preferred method for carrying out our invention, it will be understood that both are capable of variation and modification while still employing the principles of our invention. It is to be understood, therefore, that the scope of the invention should be limited only by the scope and proper interpretation of the claims appended hereto.

Having thus described our invention, what we claim as new and desire to protect by Letters Patent is:

1. A machine for handling cartons emerging from a carton filling machine in endwise position, each carton having a hinged cover disposed in open position and with the flange of the cover collapsed upon the underside of the cover substantially within the confines thereof comprising a conveyor for receiving the cartons and for advancing them endwise in a continuous uninterrupted flow along a predetermined path, means associated with the conveyor for turning the cartons sidewise with the open covers disposed in leading position, means associated with the conveyor for engaging the edge of the collapsed cover flange of each carton passing-by in a manner effective to erect said flange, and means cooperating with the flange erecting means for closing the cover of each carton while the flange thereof is in open position, said closing means comprising a pair of freely rotatable rolls and a cover guide disposed between the same and extending downwardly and rearwardly therefrom toward said conveyor terminating at a height thereabove substantially equal to the height of the cartons.

2. A machine for handling cartons emerging from a carton filling machine in endwise position comprising a conveyor table including a narrow front portion and a wide rear portion disposed in staggered relation parallel to each other and joined to form a continuous carton supporting surface, means for advancing cartons having their covers open and the flanges thereof collapsed thereon endwise along the front portion of said table, means for transferring the cartons upon the rear portion of said table and for turning them into sidewise position thereon, means for advancing the cartons sidewise along the rear portion of said table with the covers disposed in leading position, means adjacent the rear portion of the table and operating in timed relation with the last named advancing means for engaging the edges of the cover flanges of the cartons passing-by in a manner effective to open and erect said flanges, and means associated with the rear table portion for closing the covers of the cartons.

3. A machine for handling rectangular cartons emerging from a carton filling machine in endwise position, each carton having a blocked body portion and a cover hinged thereon provided with a continuous flange at the free edges thereof folded inwardly and collapsed upon the underside of the cover substantially within the confines thereof comprising a conveyor mechanism including an inspection table and a turret table disposed in staggered relation with respect to each other and joined to form a continuous table surface, means associated with the inspection table for advancing the cartons endwise there- along with the hinge of the cover parallel to the direction of travel of the cartons, means adjacent the junction of said tables and cooperating with said advancing means for transferring the cartons from the inspection table to the turret table during their advancement by said advancing means and for turning the cartons sidewise with the covers in leading position and the hinges thereof normal to the path of travel of the cartons, cooperating flange opening turrets adjacent said turret table provided with flange opening means adapted to engage the edges of the cover flanges of the cartons, means for advancing the cartons sidewise with the covers in leading position along the turret table past said turrets, means for operating said turrets in timed relation with respect to each other and the cartons advancing therepast in a manner effective to engage said cover flanges, opening means with the flange of the cartons passing-by to open the same, and means associated with the turret table and disposed within the path of travel of the covers for folding the same to closed position upon the cartons while the flanges of the covers are in open position.

4. A machine for handling cartons emerging from a carton filling machine in endwise position comprising a conveyor for receiving cartons having covers hinged thereon and disposed in open position with the flanges of the covers inwardly folded and collapsed, means for advancing the cartons endwise along said conveyor, a second conveyor adjacent and parallel to and substantially coplanar with said receiving conveyor, means associated with the receiving conveyor for transferring the cartons from the receiving conveyor to said second conveyor, a carton turning mechanism associated with said second conveyor for turning the cartons sidewise incident to their transfer from the receiving conveyor to said second conveyor to thereby dispose the cartons with their covers in leading position on said second conveyor, means for advancing the cartons with their covers in leading position along said second conveyor, means associated with said second conveyor for engaging the edges of the cover flanges of the cartons during their conveyance along said second conveyor in a manner effective to open and erect said flanges, and means cooperating with said flange opening means for closing the covers of the cartons while their flanges are in open position.

5. A machine for handling cartons emerging from a carton filling machine in endwise position comprising a conveyor for receiving filled cartons having their covers hinged thereon and disposed in open position with the flanges of the covers inwardly folded and collapsed, means for advancing the cartons endwise along said conveyor, a second conveyor adjacent and parallel to and substantially coplanar with said receiving conveyor, means associated with the receiving conveyor for transferring the cartons from the receiving conveyor to said second conveyor, a carton turning mechanism associated with said second conveyor for turning the cartons sidewise incident to their transfer from the receiving conveyor to said second conveyor to thereby dispose the cartons with their covers in leading position, means for advancing the cartons with their covers in leading position along said second conveyor, means associated with the second conveyor for engaging the cover flanges of the cartons during their conveyance along said second conveyor in a manner effective to open and erect the same, means cooperating with said flange opening means for closing the covers of the cartons while their flanges are in open position, and means for receiving the cartons from said second conveyor and for pressing the covers of the cartons into firmly closed position and for pressing the cartons into shape.

6. A machine for handling cartons emerging from a carton filling machine in endwise position comprising a receiving conveyor for receiving cartons having their covers hinged thereon and the flanges thereof folded inwardly and collapsed, means for advancing the cartons endwise along said conveyor, a second conveyor adjacent and parallel to and substantially coplanar with said receiving conveyor, means for transferring the cartons from the receiving conveyor to said second conveyor, means for turning the cartons into sidewise position incident to their transfer to said second conveyor, means for advancing the cartons sidewise with their covers disposed in leading position along said second conveyor, a pair of cooperating flange opening turrets disposed at opposite sides of said second conveyor and provided with flange engaging arms for engaging and opening up the collapsed flanges of the covers during the advancement of the cartons therepast, and means associated with the second conveyor and cooperating with said flange opening turrets for closing the covers while the flanges thereof are in open position.

7. A carton handling machine comprising a conveyor for receiving cartons having their covers hinged thereon and the flanges of the covers folded inwardly and collapsed substantially within the confines of said covers, means for advancing the cartons with the covers disposed in leading position along said conveyor, flange opening turrets disposed adjacent the path of travel of the cartons having arms adapted to engage the edges of the cover flanges of the cartons passing-by in a manner effective to open the same, means for engaging and closing the covers during the advancement of the cartons along said conveyor, and means associated with the conveyor and effective to move into the space between the end walls of the cartons and the adjacent portions of the opened cover flanges for maintaining the flanges of the covers in open position during the closing of the covers.

8. A carton closing machine comprising a conveyor for receiving cartons having their covers disposed in open position and the flanges of the covers folded inwardly and collapsed within the confines thereof, means for conveying the cartons along said conveyor with the covers disposed in leading position, a pair of cooperating flange opening turrets associated with said conveyor for opening the collapsed flanges of the covers during the conveyance of the cartons therepast, means for continuously rotating said turrets in timed relation to the advancement of the cartons along said conveyor, and means associated with the conveyor for closing the covers while the flanges thereof are in open position, said flange opening turrets each comprising a pair of cooperating arms adapted to engage the upper and lower surfaces of the cover, respectively of each carton passing-by, and to receive the cover of each carton therebetween during its advancement therepast, the arms of the turrets engaging the inner surface of the cover being provided with hooked portions for engaging the collapsed flange of each cover during the rotation of the turrets and for erecting said flange during the advancement of the carton therepast incident to the rotation of said turrets.

9. In a carton closing machine a pair of flange opening turrets disposed in spaced relation with respect to each other, each of said turrets comprising a cover supporting arm and a flange opening arm arranged in spaced relation adjacent each other, and means for rotating said turrets to move the arms thereof into and out of alignment with respect to each other to thereby receive therebetween the open covers of cartons having their flanges collapsed thereon while the cartons are advanced past said turrets, the flange opening arm of each turret being provided with a hook portion for engaging the collapsed flanges of the covers and for pulling the same outwardly into opened and erected positions incident to the advancement of the cartons and the rotation of the turrets relative thereto.

10. In a carton closing machine, a pair of flange opening turrets disposed in spaced relation with respect to each other, each of said turrets comprising a cover supporting arm fixed thereto and a flange opening arm pivotally mounted thereon, resilient means for normally maintaining the flange opening arm of each turret in predetermined spaced relation relative to the cover supporting arm thereof, means for rotating said turrets to move the arms thereof into and out of alignment with respect to each other to thereby receive the open cover of a carton therebetween during advancement of said carton past said turrets, the flange opening arms of each turret being provided with a hook portion for engaging the collapsed flange of the cover of the carton and for erecting the same incident to the advancement of the carton therepast while said turrets are rotated to move said arms in the direction of the advancing carton.

11. In a carton closing machine cooperating flap opening turrets, each of said turrets comprising a fixed cover supporting arm and a pivotally mounted flange engaging arm adapted to receive the cover of a carton provided with a collapsed flange therebetween, means for advancing the carton along a predetermined path between said turrets, means for rotating said turrets in opposite directions to effect travel of said arms in the direction of travel of the carton while the arms are in engagement with the cover thereof whereby the collapsed flange of the cover of the carton is engaged by the hook portions of the pivotally mounted arms and is pulled outwardly into open and erected position while the cover is held in predetermined relation with respect to the pivotally mounted arms by said fixed arms.

12. A machine for closing cartons of the type having a blocked rectangular body provided with a hinged cover having a continuous flange at the free ends thereof collapsed upon the underside of the cover substantially within the confines thereof, comprising a conveyor adapted to advance such cartons in continuous and uninterrupted flow along a predetermined path with the covers opened and in leading position, a pair of rotary turrets located at either side of said conveyor each having a first arm connected rigidly thereto and extending radially therefrom, and a second arm pivoted thereto and yieldably held in a position spaced from said first arm such that the opposite ends of the open cover of a carton passing intermediately of said turrets may be received into the spaces formed between said first and second arms, and means for operating said conveyor and said rotary turrets in timed relation, such that the first arms of said turrets support the cover of an intermediate carton at its outer surface while said second arms engage the inwardly directed edge of the folded cover flange and pull it outwardly in opposite directions.

13. A machine for closing cartons of the type having a blocked rectangular body provided with a hinged cover having a continuous flange at the free ends thereof collapsed upon the underside of the cover substantially within the confines thereof, comprising a conveyor adapted to advance such cartons in continuous and uninterrupted flow along a predetermined path with the covers opened and in leading position, a pair of rotary turrets located at either side of said conveyor each comprising a first arm connected rigidly thereto and extending radially therefrom, and a second arm pivoted thereto and yieldably held in a position spaced from said first arm such that the adjacent ends of the open cover of a carton passing by the said turrets may be received into the space between said first and second arms, means for operating said conveyor and said rotary turrets in timed relation, with the confronting segments of said turrets moving in the direction of movement of said conveyor, such that the first arms of said turrets support the cover of an intermediate carton at its outer surface while said second arms engage the inwardly directed edges of the adjacent side portions of the cover flange and pull them outwardly as the conveyor advances the carton beyond said turrets and said turrets swing said arms and said fingers laterally away from said conveyor, and means disposed above said conveyor beyond said turrets for folding the covers of cartons traveling on said conveyor upon the bodies of said cartons.

14. A machine for closing cartons of the type having a blocked body provided with a hinged cover having a continuous flange at the free ends thereof collapsed upon the underside of the cover substantially within the confines thereof, comprising a conveyor adapted to advance such cartons in continuous flow along a predetermined path with the covers opened and in leading position, a pair of rotary turrets located at either side of said conveyor each comprising a first arm connected rigidly thereto and extending radially therefrom, and a second arm pivoted thereto and yieldably held in a position spaced from said first arm such that the opposite ends of the open cover of a carton passing intermediately of said turrets may be received into the spaces formed between said first and second arms, means for operating said conveyor and said rotary turrets in timed relation, such that the first arms of said turrets support the cover of an intermediate carton at its outer surface while said second arms engage the inwardly directed edge of the folded cover flange and pull it outwardly in opposite directions as the conveyor advances the carton beyond said turrets and said turrets swing said arms and said fingers laterally away from said conveyor, means disposed above said conveyor beyond said turrets in the direction of movement of said conveyor for folding the covers of cartons traveling on said conveyor upon the bodies of said cartons, and means flanking said conveyor and arranged to enter between the adjacent sides of the carton bodies and the opened side portions of its cover flanges for holding said flanges temporarily in opened position as said cover folding means acts to fold the covers upon the carton bodies.

15. In a carton handling machine, the combination of a pair of offset substantially parallel connecting slideways for supporting a moving carton, means for positively advancing a carton along said slideways, means disposed adjacent the discharge end of one slideway and engageable with the leading end of an advancing carton at one side thereof to divert it toward the receiving end of the other slideway, and means adjacent said diverting means for engaging the leading end of the diverted carton at the opposite side thereof, said engaging means cooperating with said advancing means for turning the carton into a different position as it is diverted into the other slideway for continued advancement therealong in said different position by said advancing means.

16. In a machine for handling rectangular cartons, the combination of a pair of laterally offset substantially parallel adjoining slideways providing a continuous communicating support for guiding a moving carton in a predetermined direction of travel, means for positively advancing the carton along each of said slideways in succession, fixed arcuate guide means disposed at one side of the discharge end of the preceding slideway and engageable with the leading end of an advancing carton at one side thereof to deflect the carton into the open receiving end of the offset succeeding slideway, and movable carton engaging means spaced from said deflecting means on the opposite side of said slideway discharge end, said carton engaging means cooperating with said carton deflecting and advancing means for yieldably engaging and retarding the leading end of the diverted carton at the opposite side thereof for orienting the moving carton into an angularly related position as the carton is deflected into said succeeding slideway for continued advancement therealong in said oriented position by said advancing means.

17. In a machine for handling rectangular cartons, the combination of a pair of laterally offset substantially parallel communicating slideways disposed in a common plane for successively and continuously supporting moving cartons, conveyor means for positively advancing the cartons in processional order and in successively different positions along said slideways respectively, curved guide means disposed at one side of the discharge end of the first slideway for engagement by the adjacent leading end portion of an endwise advancing carton to divert and transfer the carton into the receiving end of the succeeding offset slideway, and a pivotally mounted spring tensioned member disposed on the opposite side of said discharge end from said curved guide means, said member cooperating with said conveyor means to engage and yieldably restrain forward movement of the adjoining leading end portion of the moving carton during transfer thereof, thereby serving to turn said carton at right angles into a sidewise position for continued advancement along the succeeding slideway by said conveyor means.

CHARLES E. KERR.
ROSCOE ELSHEIMER.

References Cited in the file of this patent
UNITED STATES PATENTS

| Number | Name | Date |
| --- | --- | --- |
| 931,434 | Krummel et al. | Aug. 17, 1909 |
| 1,119,091 | Martin | Dec. 1, 1914 |

(Other references on following page)

UNITED STATES PATENTS

| Number | Name | Date |
|---|---|---|
| 1,136,353 | Martin | Apr. 20, 1915 |
| 1,141,156 | Tremaine | June 1, 1915 |
| 1,143,745 | Bloomer | June 22, 1915 |
| 1,503,936 | Benoit | Aug. 5, 1924 |
| 1,559,237 | Fox | Oct. 27, 1925 |
| 1,641,970 | Henderson | Sept. 13, 1927 |
| 1,654,566 | Wild | Jan. 3, 1928 |
| 1,733,409 | Howe | Oct. 29, 1929 |
| 1,739,853 | Nelson | Dec. 17, 1929 |
| 2,135,806 | Fermann et al. | Nov. 8, 1938 |
| 2,308,010 | Horowitz | Jan. 12, 1943 |
| 2,328,758 | Vergobbi | Sept. 7, 1943 |
| 2,371,888 | Hermani | Mar. 20, 1945 |
| 2,391,708 | Johnson et al. | Dec. 25, 1945 |
| 2,437,835 | Riege et al. | Mar. 16, 1948 |
| 2,440,120 | Ringler | Apr. 20, 1948 |
| 2,441,410 | Guyer et al. | May 11, 1948 |

FOREIGN PATENTS

| Number | Country | Date |
|---|---|---|
| 479,675 | Germany | June 27, 1929 |